(12) United States Patent
Nienke

(10) Patent No.: US 11,291,184 B2
(45) Date of Patent: Apr. 5, 2022

(54) WATERING TANK CIRCULATING ASSEMBLY

(71) Applicant: Kelly Nienke, Sylvia, KS (US)

(72) Inventor: Kelly Nienke, Sylvia, KS (US)

( * ) Notice: Subject to any disclaimer, the term of this patent is extended or adjusted under 35 U.S.C. 154(b) by 477 days.

(21) Appl. No.: 16/385,131

(22) Filed: Apr. 16, 2019

(65) Prior Publication Data
US 2020/0329669 A1  Oct. 22, 2020

(51) Int. Cl.
*A01K 7/02* (2006.01)
*F04B 23/02* (2006.01)
*F04D 13/08* (2006.01)

(52) U.S. Cl.
CPC .............. *A01K 7/025* (2013.01); *A01K 7/027* (2013.01); *F04B 23/021* (2013.01); *F04D 13/086* (2013.01)

(58) Field of Classification Search
CPC ................................ A01K 7/025; A01K 7/027
See application file for complete search history.

(56) References Cited

U.S. PATENT DOCUMENTS

| | | | |
|---|---|---|---|
| 2,480,053 A | 8/1949 | Schubert | |
| 3,149,775 A * | 9/1964 | Pagano | F04B 37/08 417/48 |
| 3,169,510 A * | 2/1965 | Fulton, Jr. | A01K 7/025 119/73 |
| 4,007,371 A * | 2/1977 | Njos | A01K 63/065 219/523 |
| 4,068,116 A | 1/1978 | McKinstry | |
| 4,298,022 A | 11/1981 | Walters | |
| 4,856,459 A * | 8/1989 | Wiseman | A01K 7/027 119/73 |
| 5,178,523 A * | 1/1993 | Cheng-Chung | A47K 3/10 417/423.3 |
| 5,348,452 A * | 9/1994 | Yamamoto | H02K 7/14 417/422 |
| 5,813,363 A * | 9/1998 | Snelling | A01K 7/027 119/73 |
| 5,983,889 A | 11/1999 | Thomas | |
| 6,151,448 A | 11/2000 | Reusche | |
| 6,152,707 A * | 11/2000 | Alberg | F04B 23/021 417/423.3 |
| 6,353,708 B1 * | 3/2002 | Reusche | A01K 7/027 392/455 |
| D486,896 S | 2/2004 | Long | |

(Continued)

*Primary Examiner* — Peter M Poon
*Assistant Examiner* — Morgan T Barlow

(57) ABSTRACT

A watering tank circulating assembly includes a frame submerged in a livestock watering tank. A fluid pump is coupled to the frame to circulate the water when the fluid pump is turned on. In this way the fluid pump inhibits the water from freezing. A heating coil is coupled to the frame to heat the water when the heating coil is turned on, thusly inhibiting the water from freezing. A thermostatic switch is coupled to the frame and each of the fluid pump and the heating coil is electrically coupled to the thermostatic switch. The thermostatic switch turns on each of the fluid pump and the heating coil when the temperature of the water drops below a trigger temperature. Additionally, the thermostatic switch turns off each of the fluid pump and the heating coil when the temperature of the water rises about the trigger temperature.

4 Claims, 6 Drawing Sheets

(56) References Cited

U.S. PATENT DOCUMENTS

| | | | |
|---|---|---|---|
| 7,802,614 B2* | 9/2010 | Elnar | H02K 9/22 165/46 |
| 7,853,133 B2 | 12/2010 | Reusche | |
| 8,011,032 B2* | 9/2011 | Cline | A61H 33/60 4/509 |
| 8,104,110 B2* | 1/2012 | Caudill | F04D 15/0066 4/541.1 |
| 8,121,466 B2 | 2/2012 | Reusche | |
| 8,464,661 B1* | 6/2013 | Dunn | A01K 7/02 119/73 |
| 9,609,847 B2* | 4/2017 | Van Der Poel | A01K 7/02 |
| 10,383,311 B1* | 8/2019 | Kane | A01K 39/024 |
| 2004/0094470 A1* | 5/2004 | Jackson | A01K 63/045 210/411 |
| 2006/0275151 A1* | 12/2006 | Heins | F04D 29/588 417/313 |
| 2006/0289467 A1* | 12/2006 | Reusche | A01K 7/027 219/523 |
| 2008/0002955 A1* | 1/2008 | Reusche | E02B 15/02 392/498 |
| 2008/0047498 A1* | 2/2008 | Hollyday | A01K 7/027 119/73 |
| 2009/0080873 A1* | 3/2009 | Reusche | A01K 45/002 392/498 |
| 2011/0120528 A1* | 5/2011 | West | F24S 10/30 136/248 |
| 2013/0108252 A1* | 5/2013 | Liu | F04D 29/426 392/471 |
| 2013/0209279 A1* | 8/2013 | Locke | F04B 43/046 417/53 |
| 2013/0230416 A1* | 9/2013 | Verma | F04D 29/5866 417/321 |
| 2014/0053909 A1* | 2/2014 | Savage | E03B 1/041 137/1 |
| 2014/0093225 A1* | 4/2014 | Ashton | F24H 1/101 392/396 |
| 2015/0150215 A1* | 6/2015 | Pumphrey | A01K 7/027 119/73 |
| 2018/0263212 A1* | 9/2018 | Lisk | A01K 7/025 |
| 2019/0072283 A1* | 3/2019 | Lesage | F24H 1/185 |
| 2019/0128540 A1* | 5/2019 | Lesage | F24H 1/201 |
| 2020/0208874 A1* | 7/2020 | Emery | F24D 17/0089 |
| 2020/0236902 A1* | 7/2020 | Grieger | A01K 7/025 |
| 2020/0378651 A1* | 12/2020 | Diemer Lopes | F24H 4/04 |
| 2021/0029965 A1* | 2/2021 | Luther | A01K 7/027 |

* cited by examiner

WATERING TANK CIRCULATING ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to circulating devices and more particularly pertains to a new circulating device for to inhibit water in a livestock watering tank from freezing.

BRIEF SUMMARY OF THE INVENTION

An embodiment of the disclosure meets the needs presented above by generally comprising a frame that is submerged in a livestock watering tank. A fluid pump is coupled to the frame to circulate the water in the livestock watering tank when the fluid pump is turned on. In this way the fluid pump inhibits the water from freezing. A heating coil is coupled to the frame to heat the water when the heating coil is turned on, thusly inhibiting the water from freezing. A thermostatic switch is coupled to the frame and each of the fluid pump and the heating coil is electrically coupled to the thermostatic switch. The thermostatic switch turns on each of the fluid pump and the heating coil when the temperature of the water drops below a trigger temperature. Additionally, the thermostatic switch turns off each of the fluid pump and the heating coil when the temperature of the water rises about the trigger temperature.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
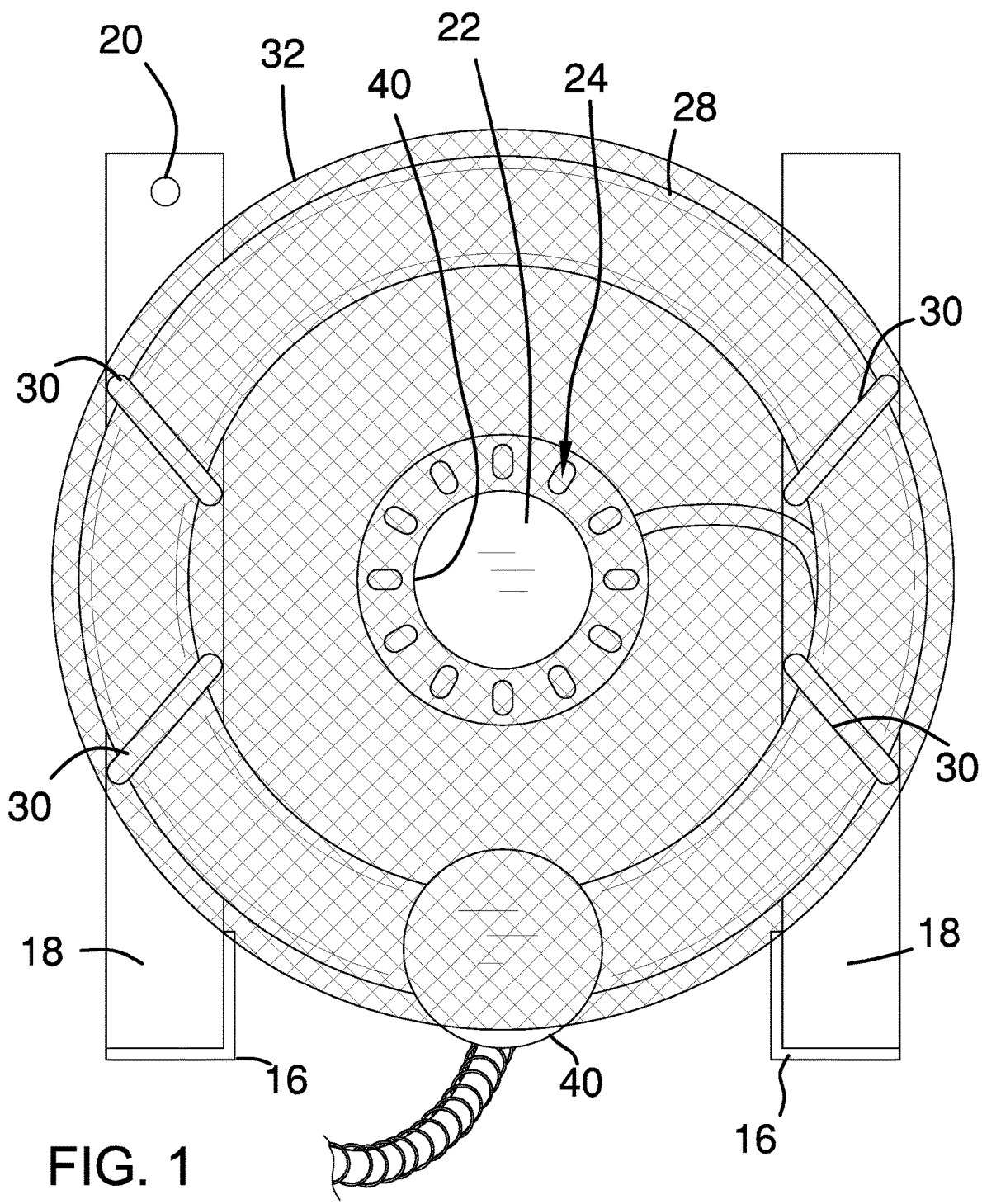
FIG. 1 is a back view of a watering tank circulating assembly according to an embodiment of the disclosure.
Figure 2:
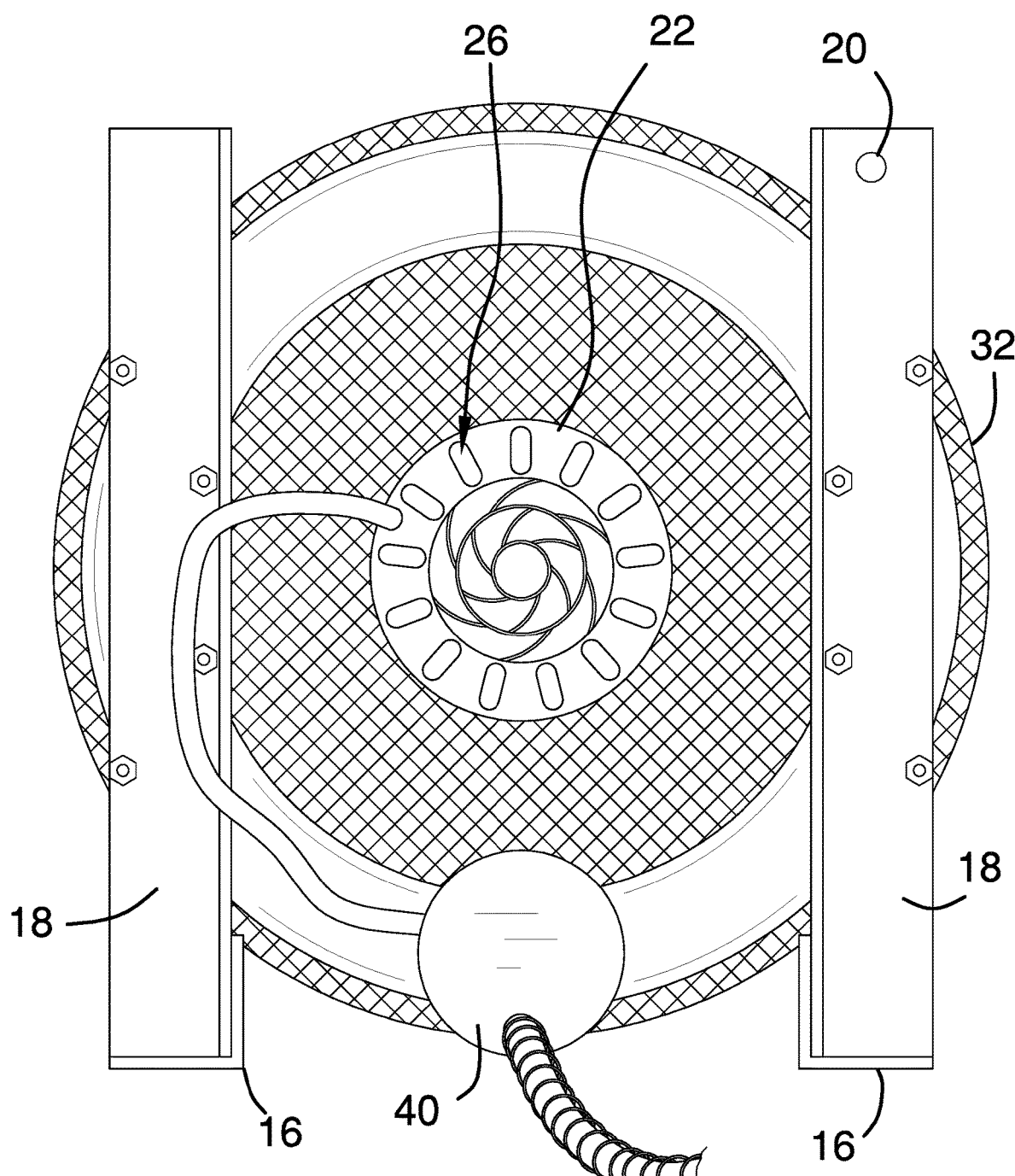
FIG. 2 is a front view of an embodiment of the disclosure.
Figure 3:
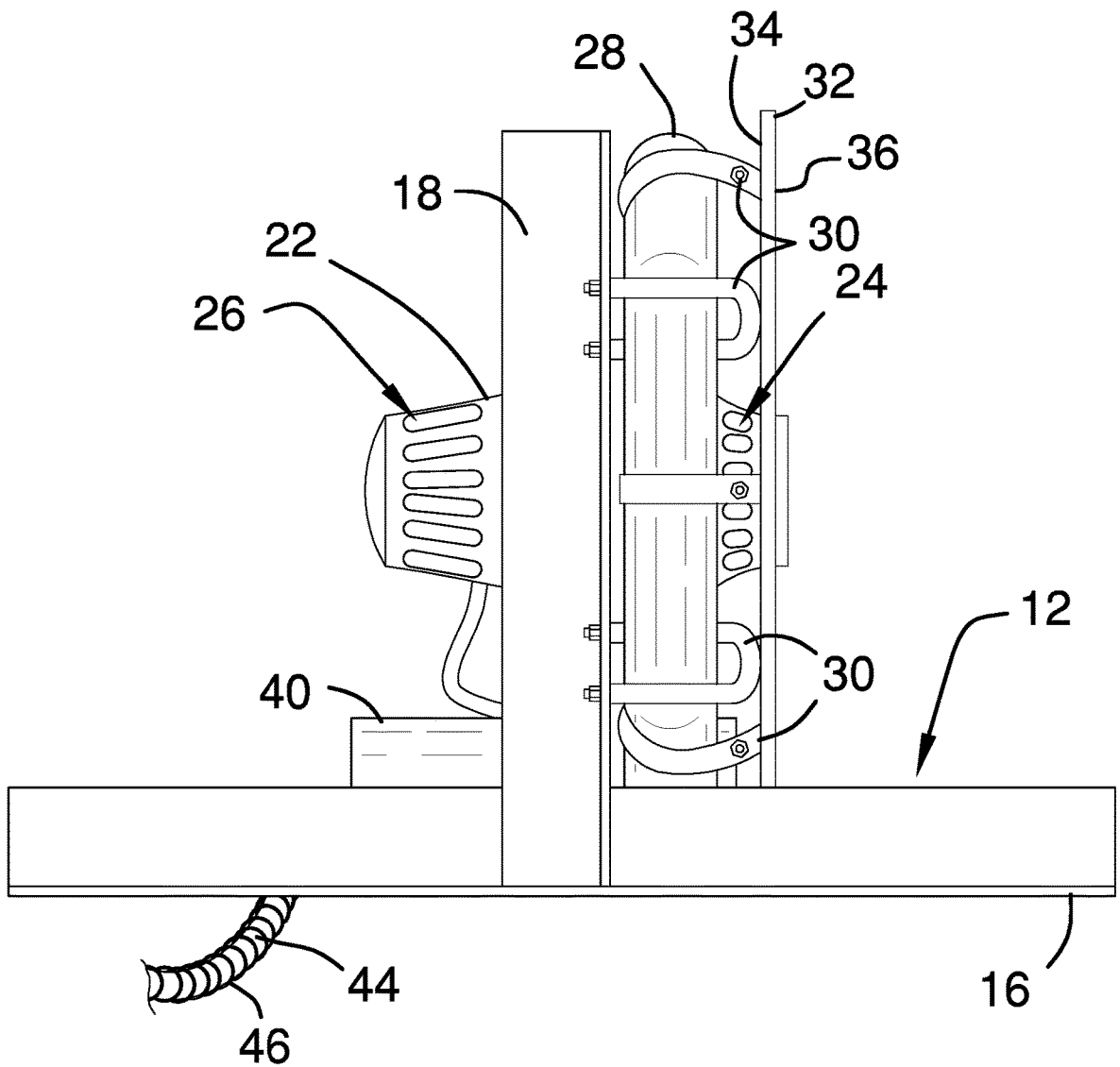
FIG. 3 is a left side view of an embodiment of the disclosure.
Figure 4:
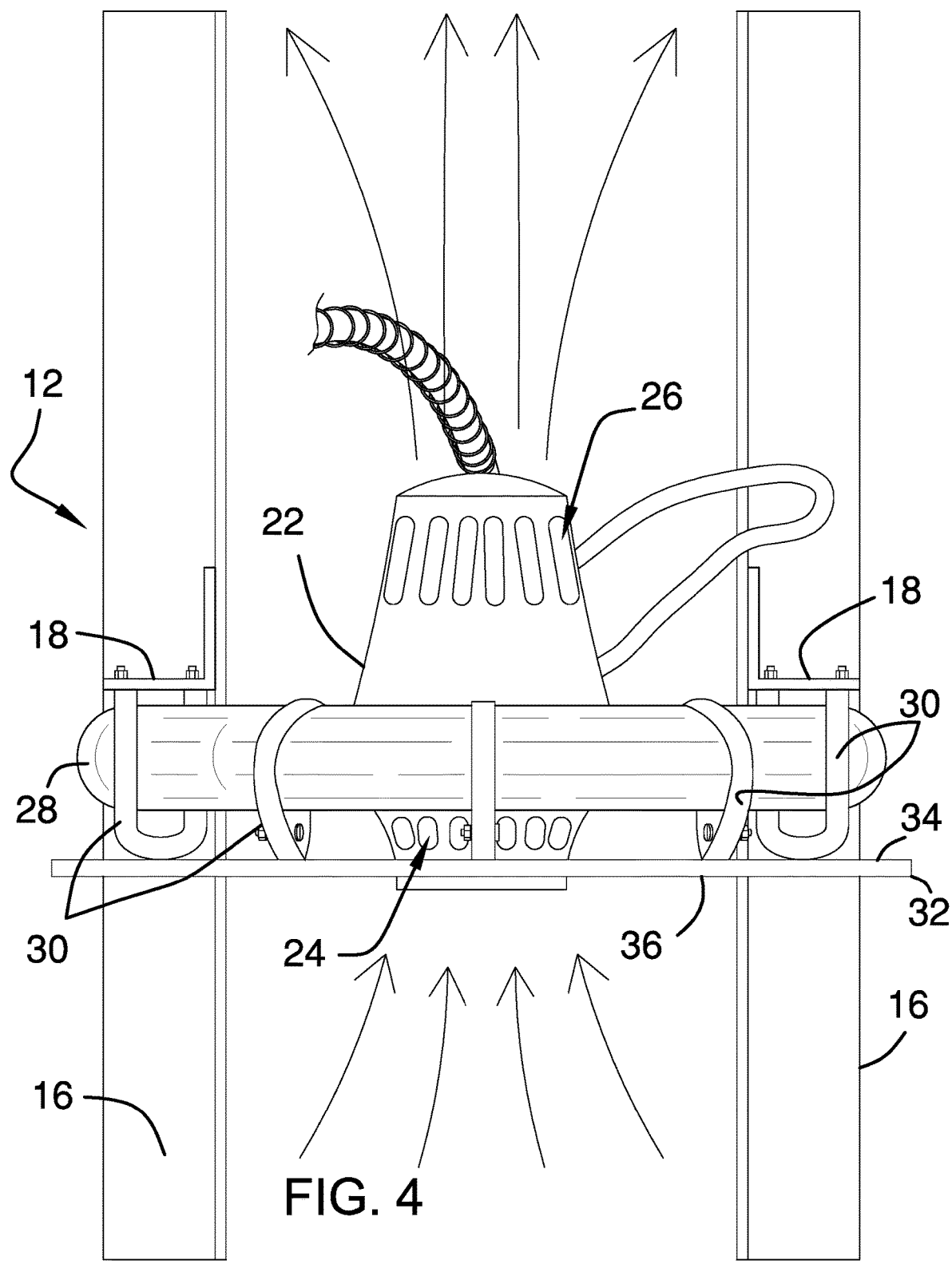
FIG. 4 is a top view of an embodiment of the disclosure.
Figure 5:
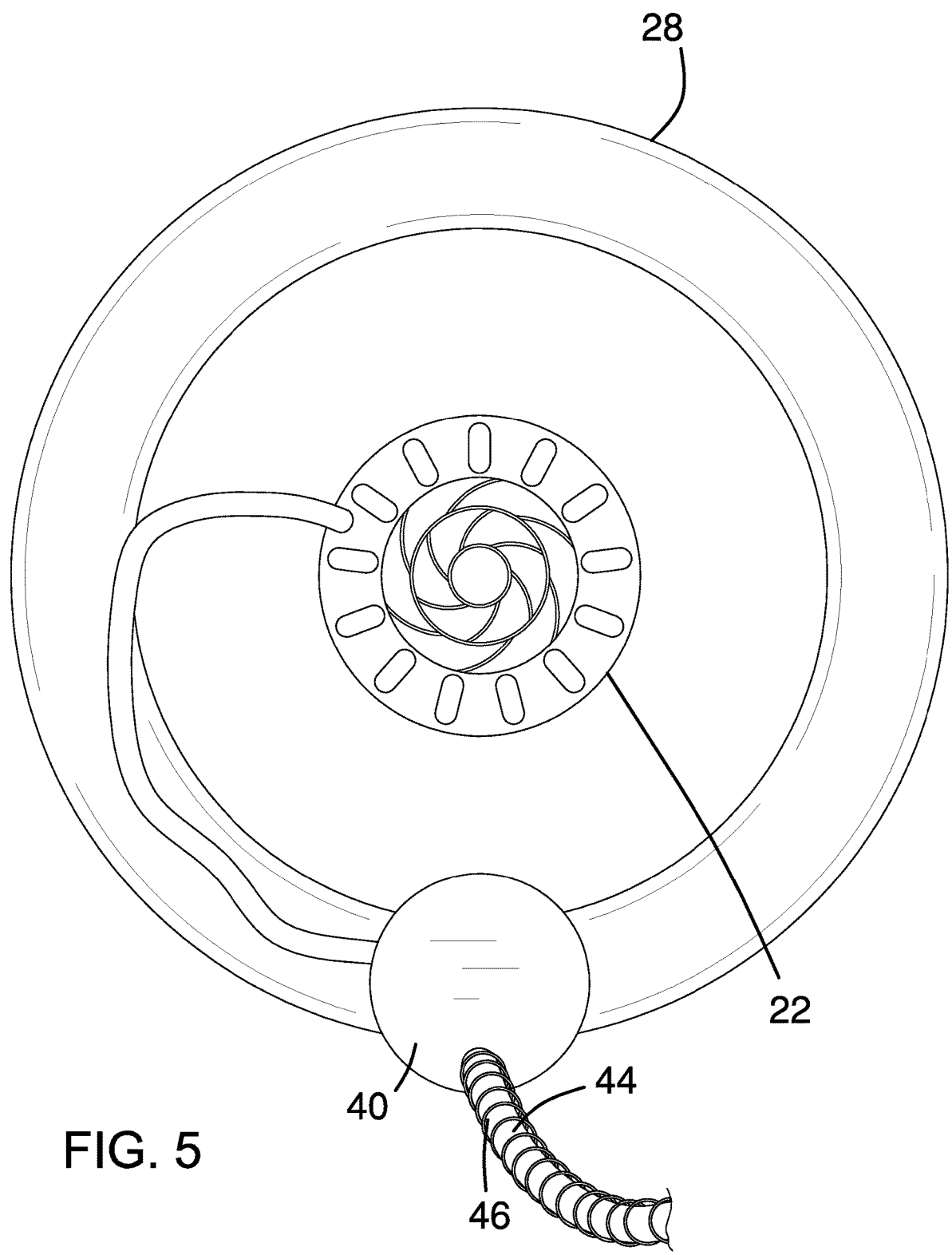
FIG. 5 is a front view of a fluid pump and a heating coil of an embodiment of the disclosure.
Figure 6:
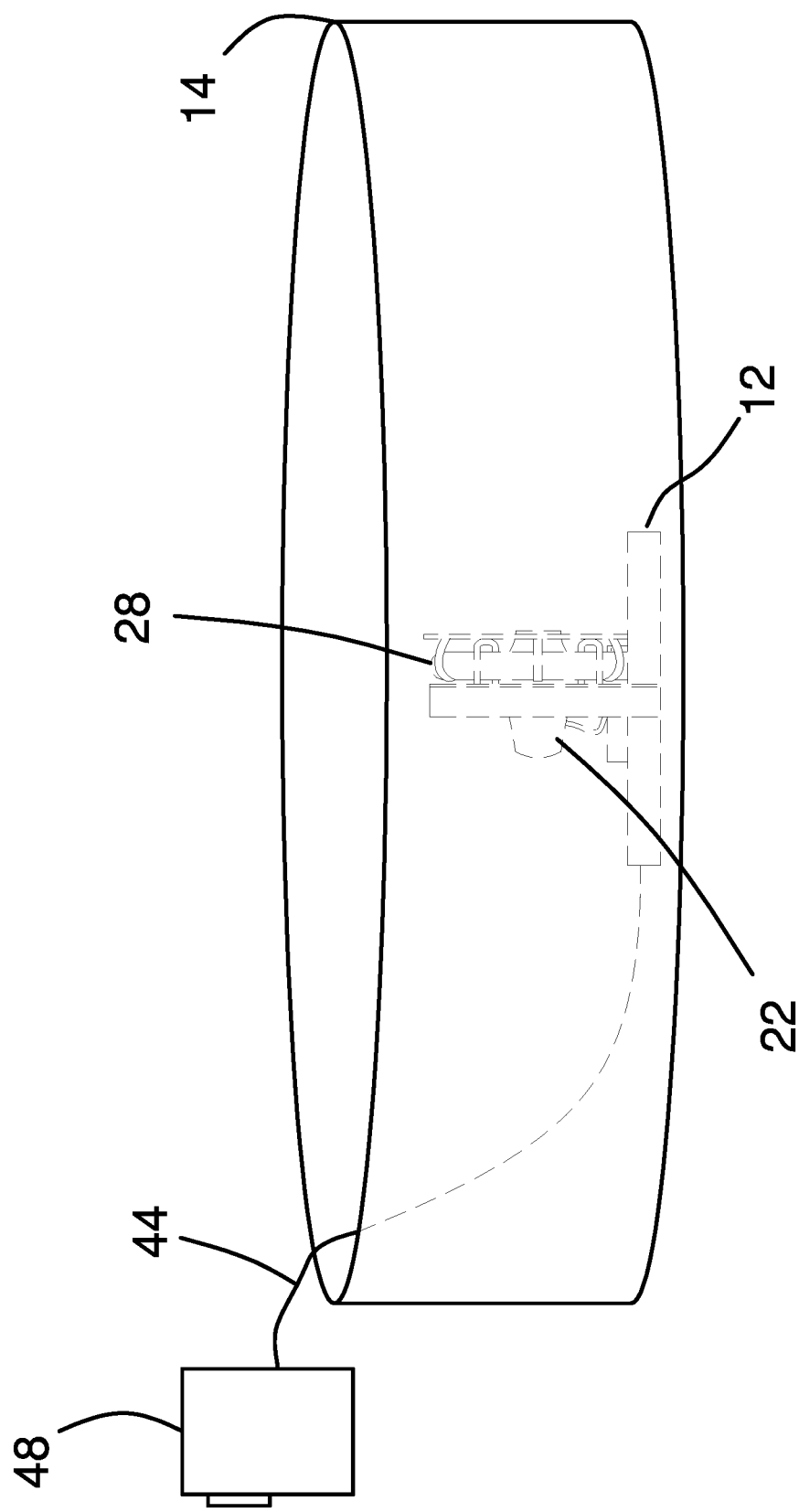
FIG. 6 is a perspective in-use view of an embodiment of the disclosure.

With reference now to the drawings, and in particular to FIGS. 1 through 6 thereof, a new circulating device embodying the principles and concepts of an embodiment of the disclosure and generally designated by the reference numeral 10 will be described.

As best illustrated in FIGS. 1 through 6, the watering tank circulating assembly 10 generally comprises a frame 12 that is submerged in a livestock watering tank 14. The livestock watering tank 14 may be a watering tank for cattle or the like. The frame 12 includes a pair of basal members 16 and a pair of upright members 18 that is each coupled to and is oriented perpendicular to a respective one of the basal members 16. Each of the basal members 16 lies on a bottom of the livestock watering tank 14 having each of the upright members 18 being vertically oriented in the livestock watering tank 14. Each of the basal 16 and upright 18 members may comprise angled aluminum or other corrosion resistant, rigid material. A connection hole 20 extends through a respective one of the upright members 18 and the connection hole 20 is distally positioned with respect to the basal members 16. A chain, or other similar support, can be coupled to the connection hole 20 for lowering the frame 12 into the livestock watering tank 14.

A fluid pump 22 is coupled to the frame 12 and the fluid pump 22 is in fluid communication with water in the livestock watering tank 14 when the frame 12 is positioned in the livestock watering tank 14. The fluid pump 22 circulates the water in the livestock watering tank 14 when the fluid pump 22 is turned on to inhibit the water from freezing. The fluid pump 22 has an intake 24 and an exhaust 26, and the fluid pump 22 is centrally positioned between the upright members 18 such that the intake 24 and exhaust 26 are oriented along a horizontal axis when the frame 12 is positioned in the livestock watering tank 14. Moreover, the fluid pump 22 urges the water inwardly through the intake 24 and outwardly through the exhaust 26 when the fluid pump 22 is turned on. The fluid pump 22 may be an electric submersible water pump that has a flow rate of approximately 2450.0 gallons per hour.

A heating coil 28 is coupled to the frame 12 and the heating coil 28 is in thermal communication with the water in the livestock watering tank 14 when the frame 12 is positioned in the livestock watering tank 14. The heating coil 28 heats the water when the heating coil 28 is turned on to inhibit the water from freezing. The heating coil 28 is coupled between each of the upright members 18 such that the heating coil 28 surrounds the fluid pump 22. In this way the fluid pump 22 urges the water to pass through the heating coil 28 when the fluid pump 22 is turned on. Additionally, the heating coil 28 may be a circular heating coil with an operational rating of approximately 1000.0 watts.

A plurality of brackets 30 is each positioned around the heating coil 28. Each of the brackets 30 engages a respective one of the upright members 18 to retain the heating coil 28 on the upright members 18. Additionally, each of the brackets 30 may comprise a u-bolt or other similar fastener. A screen 32 is provided that has a front side 34 and a back side 36, and the screen 32 has a pump opening 38 extending through the front 34 and back 36 sides. The front side 34 is coupled to each of the brackets 30 and the pump opening 38 is aligned with the fluid pump 22 such that the fluid pump 22 can extend through the pump opening 38. Moreover, the screen 32 is spaced from the intake 24 of the fluid pump 22. The screen 32 is comprised of a fluid permeable material, such as metal mesh or the like, to inhibit debris from entering the intake 24 of the fluid pump 22.

A thermostatic switch 40 is coupled to the frame 12 and the thermostatic switch 40 is in thermal communication with the water in the livestock watering tank 14 when the frame 12 is positioned in the livestock watering tank 14. Each of the fluid pump 22 and the heating coil 28 is electrically coupled to the thermostatic switch 40. The thermostatic switch 40 turns on each of the fluid pump 22 and the heating coil 28 when a temperature of the water drops below a trigger temperature. Moreover, the thermostatic switch 40 turns off each of the fluid pump 22 and the heating coil 28 when the temperature of the water rises about the trigger temperature. The trigger temperature may be approximately 42.0 degrees Fahrenheit.

A power cord 44 is electrically coupled to the thermostatic switch 40. The power cord 44 is shielded with a resilient material 46 to resist being chewed by the livestock. Additionally, the power cord 44 is electrically coupled to a power source 48 comprising a female electrical outlet.

In use, the frame 12 is lowered into the livestock watering tank 14 when ambient temperatures are expected to be at or below the freezing point of water and the power cord 44 is plugged into the power source 48. The thermostatic switch 40 turns on each of the fluid pump 22 and the heating coil 28 when the temperature of the water drops below the trigger temperature. Thus, the heating coil 28 heats the water and the fluid pump 22 circulates the water thereby inhibiting the water from freezing. In this way the livestock can drink from the livestock watering tank 14 without being restricted by ice on the surface of the water. Thus, a caretaker of the livestock does not have to continually monitor the water for ice and the livestock have continuous access to the water for drinking.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A watering tank circulating assembly being configured to circulate and heat water in a livestock drinking tank thereby inhibiting the water from freezing, said assembly comprising:

a frame being submerged in a livestock watering tank;

a fluid pump being coupled to said frame, wherein said fluid pump is configured to be in fluid communication with water in the livestock watering tank when said frame is positioned in the livestock watering tank, said fluid pump circulating the water in the livestock watering tank when said fluid pump is turned on, wherein said fluid pump is configured to inhibit the water from freezing;

a heating coil being coupled to said frame, wherein said heating coil is configured to be in thermal communication with the water in the livestock watering tank when said frame is positioned in the livestock watering tank, said heating coil heating the water when said heating coil is turned on, wherein said heating coil is configured to inhibit the water from freezing;

a thermostatic switch being coupled to said frame, wherein said thermostatic switch is configured to be in thermal communication with the water in the livestock watering tank when said frame is positioned in the livestock watering tank, each of said fluid pump and said heating coil being electrically coupled to said thermostatic switch, said thermostatic switch turning on each of said fluid pump and said heating coil when a temperature of the water drops below a trigger temperature, said thermostatic switch turning off each of said fluid pump and said heating coil when the temperature of the water rises about said trigger temperature;

wherein said frame includes a pair of basal members and a pair of upright members, each of the upright members being coupled to and being oriented perpendicular to a respective one of said basal members, each of said basal members lying on a bottom of the livestock watering tank having each of said upright members being vertically oriented in the livestock watering tank;

wherein said fluid pump has an intake and an exhaust, said fluid pump being centrally positioned between said upright members such that said intake and exhaust are oriented along a horizontal axis when said frame is positioned in the livestock watering tank, said fluid pump urging the water inwardly through said intake and outwardly through said exhaust when said fluid pump is turned on;

wherein said heating coil is coupled between each of said upright members such that said heating coil surrounds said fluid pump; and wherein said assembly includes a plurality of brackets, each of said brackets being positioned around said heating coil, each of said brackets engaging a respective one of said upright members to retain said heating coil on said upright members.

2. The assembly according to claim 1, further comprising a screen having a front side and a back side, said screen having a pump opening extending through said front and back sides, said front side being coupled to each of said brackets, said pump opening being aligned with said fluid pump such that said fluid pump extends through said pump opening, said screen being spaced from said intake of said fluid pump, said screen being comprised of a fluid permeable material wherein said screen is configured to inhibit debris from entering said intake of said fluid pump.

3. The assembly according to claim 1, further comprising a power cord being electrically coupled to said thermostatic switch, said power cord being shielded with a resilient material Wherein said power cord is configured to resist being chewed by the livestock, said power cord being electrically coupled to a power source comprising a female electrical outlet.

4. A watering tank circulating assembly being configured to circulate and heat water in a livestock drinking tank thereby inhibiting the water from freezing, said assembly comprising:

a frame being submerged in a livestock watering tank, said frame including a pair of basal members and a pair of upright members, each of the upright members being coupled to and being oriented perpendicular to a respective one of said basal members, each of said basal members lying on a bottom of the livestock watering tank having each of said upright members being vertically oriented in the livestock watering tank;

a fluid pump being coupled to said frame, wherein said fluid pump is configured to be in fluid communication with water in the livestock watering tank when said frame is positioned in the livestock watering tank, said fluid pump circulating the water in the livestock watering tank when said fluid pump is turned on, wherein said fluid pump is configured to inhibit the water from freezing, said fluid pump having an intake and an exhaust, said fluid pump being centrally positioned between said upright members such that said intake and exhaust are oriented along a horizontal axis when said frame is positioned in the livestock watering tank, said fluid pump urging the water inwardly through said intake and outwardly through said exhaust when said fluid pump is turned on;

a heating coil being coupled to said frame, wherein said heating coil is configured to be in thermal communication with the water in the livestock watering tank when said frame is positioned in the livestock watering tank, said heating coil heating the water when said heating coil is turned on, wherein said heating coil is configured to inhibit the water from freezing, said heating coil being coupled between each of said upright members such that said heating coil surrounds said fluid pump;

a plurality of brackets, each of said brackets being positioned around said heating coil, each of said brackets engaging a respective one of said upright members to retain said heating coil on said upright members;

a screen having a front side and a back side, said screen having a pump opening extending through said front and back sides, said front side being coupled to each of said brackets, said pump opening being aligned with said fluid pump such that said fluid pump extends through said pump opening, said screen being spaced from said intake of said fluid pump, said screen being comprised of a fluid permeable material wherein said screen is configured to inhibit debris from entering said intake of said fluid pump;

a thermostatic switch being coupled to said frame, wherein said thermostatic switch is configured to be in thermal communication with the water in the livestock watering tank when said frame is positioned in the livestock watering tank, each of said fluid pump and said heating coil being electrically coupled to said thermostatic switch, said thermostatic switch turning on each of said fluid pump and said heating coil when a temperature of the water drops below a trigger temperature, said thermostatic switch turning off each of said fluid pump and said heating coil when the temperature of the water rises about said trigger temperature; and a power cord being electrically coupled to said thermostatic switch, said power cord being shielded with a resilient material wherein said power cord is configured to resist being chewed by the livestock, said power cord being electrically coupled to a power source comprising a female electrical outlet.

\* \* \* \* \*